(12) United States Patent
Nelson et al.

(10) Patent No.: US 10,704,818 B2
(45) Date of Patent: Jul. 7, 2020

(54) METHOD AND SYSTEM FOR DYNAMIC POWER ALLOCATION IN A TRANSPORT REFRIGERATION SYSTEM

(71) Applicant: THERMO KING CORPORATION, Minneapolis, MN (US)

(72) Inventors: Matthew S. Nelson, Cottage Grove, MN (US); Dean M. Parker, Eden Prairie, MN (US); Titilope Z. Sule, Columbia Heights, MN (US); Alan D. Gustafson, Eden Prairie, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 16/237,963

(22) Filed: Jan. 2, 2019

(65) Prior Publication Data

US 2019/0137157 A1   May 9, 2019

Related U.S. Application Data

(63) Continuation of application No. 14/582,275, filed on Dec. 24, 2014, now Pat. No. 10,174,979.

(Continued)

(51) Int. Cl.
*B60H 1/00*     (2006.01)
*B60H 1/32*     (2006.01)
(Continued)

(52) U.S. Cl.
CPC ....... *F25B 49/022* (2013.01); *B60H 1/00428* (2013.01); *B60H 1/3226* (2013.01);
(Continued)

(58) Field of Classification Search
CPC . B60H 1/00428; B60H 1/3226; B60H 1/3232
See application file for complete search history.

(56) References Cited

U.S. PATENT DOCUMENTS

| 5,515,693 A | 5/1996 | Cahill-O'Brien et al. |
| 6,141,981 A | 11/2000 | Reason et al. |
| (Continued) | | |

FOREIGN PATENT DOCUMENTS

| CN | 101681177 | 3/2010 |
| CN | 102272541 | 12/2011 |
| CN | 103167964 | 6/2013 |

OTHER PUBLICATIONS

Chinese Office Action issued in corresponding Chinese Application No. 201480071377.4 dated Jun. 1, 2018 (12 pages).

(Continued)

*Primary Examiner* — Edward F Landrum
*Assistant Examiner* — Daniel C Comings
(74) *Attorney, Agent, or Firm* — Hamre, Schumann, Mueller & Larson, P.C.

(57) ABSTRACT

A method and system for dynamic power allocation in a transport refrigeration system (TRS) is provided. The method includes a TRS power source operating in an operational state. The method also includes monitoring an amount of current being drawn from one or more generator powered components of the TRS. Also, the method includes calculating, via a TRS controller of the TRS, a maximum available horsepower amount based on the amount of current being drawn from the one or more generator powered components. Further, the method includes controlling, via the TRS controller, an amount of horsepower directed to a compressor of the TRS based on the maximum available horsepower amount.

15 Claims, 4 Drawing Sheets

Related U.S. Application Data

(60) Provisional application No. 61/920,908, filed on Dec. 26, 2013.

(51) Int. Cl.
*F25B 49/02* (2006.01)
*F25B 31/02* (2006.01)

(52) U.S. Cl.
CPC .......... *B60H 1/3232* (2013.01); *F25B 31/02* (2013.01); *F25B 49/025* (2013.01); *F25B 2600/024* (2013.01); *F25B 2700/15* (2013.01); *Y02T 10/88* (2013.01)

(56) References Cited

U.S. PATENT DOCUMENTS

| | | | |
|---|---|---|---|
| 6,148,627 A | 11/2000 | Reason et al. | |
| 6,318,100 B1 | 11/2001 | Brendel et al. | |
| 6,487,869 B1* | 12/2002 | Sulc | B60H 1/3205 62/228.4 |
| 6,622,505 B2 | 9/2003 | Anderson et al. | |
| 6,755,041 B2 | 6/2004 | Wessells et al. | |
| 2002/0108388 A1 | 8/2002 | Wilson et al. | |
| 2002/0162344 A1 | 11/2002 | Reason et al. | |
| 2004/0194498 A1 | 10/2004 | Burchill et al. | |
| 2006/0248907 A1* | 11/2006 | Allen | B60H 1/00428 62/183 |
| 2007/0283713 A1 | 12/2007 | Masselus | |
| 2010/0045105 A1 | 2/2010 | Bovio et al. | |
| 2010/0171364 A1* | 7/2010 | Awwad | B60H 1/3226 307/9.1 |
| 2011/0110791 A1 | 5/2011 | Donnat et al. | |
| 2011/0162395 A1 | 7/2011 | Chakiachvili et al. | |
| 2011/0247350 A1* | 10/2011 | Awwad | F25B 27/00 62/115 |
| 2013/0000342 A1 | 1/2013 | Blasko et al. | |
| 2013/0289847 A1 | 10/2013 | Olaleye et al. | |

OTHER PUBLICATIONS

European Search Report issued in corresponding European Application No. 14875643.0 dated Aug. 1, 2017 (7 pages).
International Search Report and Written Opinion of International Application No. PCT/US2014/072317, dated Apr. 14, 2015, 14 pgs.

* cited by examiner

METHOD AND SYSTEM FOR DYNAMIC POWER ALLOCATION IN A TRANSPORT REFRIGERATION SYSTEM

FIELD

Embodiments of this disclosure relate generally to a transport refrigeration system (TRS). More specifically, the embodiments relate to a method and system for dynamic power allocation in a TRS.

BACKGROUND

A transport refrigeration system (TRS) is generally used to control an environmental condition (e.g., temperature, humidity, air quality, and the like) within a refrigerated transport unit (e.g., a container on a flat car, an intermodal container, etc.), a truck, a box car, or other similar transport unit (generally referred to as a "refrigerated transport unit"). Refrigerated transport units are commonly used to transport perishable items such as produce, frozen foods, and meat products. Typically, a transport refrigeration unit (TRU) is attached to the refrigerated transport unit to control the environmental condition of the cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

Embodiments of this disclosure relate generally to a transport refrigeration system (TRS). More specifically, the embodiments relate to a method and system for dynamic power allocation in a TRS.

In some embodiments, a TRS includes a dynamic power allocation system. The dynamic power allocation system can be configured to monitor a current draw from various generator powered components of the TRS receiving current from a generator (e.g., an alternator and/or a TRU battery charger) and dynamically allocate a maximum allowable power to the compressor based on the monitored current draw.

When an electric drive motor is used, the dynamic power allocation system allows a power efficiency of the electric drive motor to be maximized. Accordingly, a maximum allowable horsepower can be dynamically allocated to the compressor thereby utilizing a true potential of the electric drive motor as opposed to, for example, setting a predefined limit as to the amount of power that can be allocated to the compressor. Thus, the embodiments described herein can prevent the electric drive motor from overloading which can reduce the overall life expectancy of the electric drive motor and can prevent damage to portions of the electric drive motor (e.g., a motor winding insulation of the electric drive motor).

When an engine is used, the dynamic power allocation system can prevent overloading of the engine. By preventing overloading of the engine, the dynamic power allocation system can thereby prevent the TRS from exceeding, for example, emissions limits.

In one embodiment, a method for dynamic power allocation in a TRS is provided. The method includes a TRS power source operating in an operational state. The method also includes monitoring an amount of current being drawn from one or more generator powered components of the TRS. Also, the method includes calculating, via a TRS controller of the TRS, a maximum available horsepower amount based on the amount of current being drawn from the one or more generator powered components. Further, the method includes controlling, via the TRS controller, an amount of horsepower directed to a compressor of the TRS based on the maximum available horsepower amount.

In another embodiment, a TRS is provided that includes a refrigeration circuit, a TRS power source, one or more generator powered components, a current source and a TRS controller. The refrigeration circuit includes a compressor. The TRS power source is configured to drive the compressor. The current source is configured to provide current to the one or more generator powered components. The TRS controller is programmed to monitor an amount of current being drawn from the one or more generator powered components, calculate a maximum available horsepower amount based on the amount of current being drawn from the one or more generator powered components, and control an amount of horsepower allocated to the compressor based on the maximum available horsepower amount.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Figure 1:
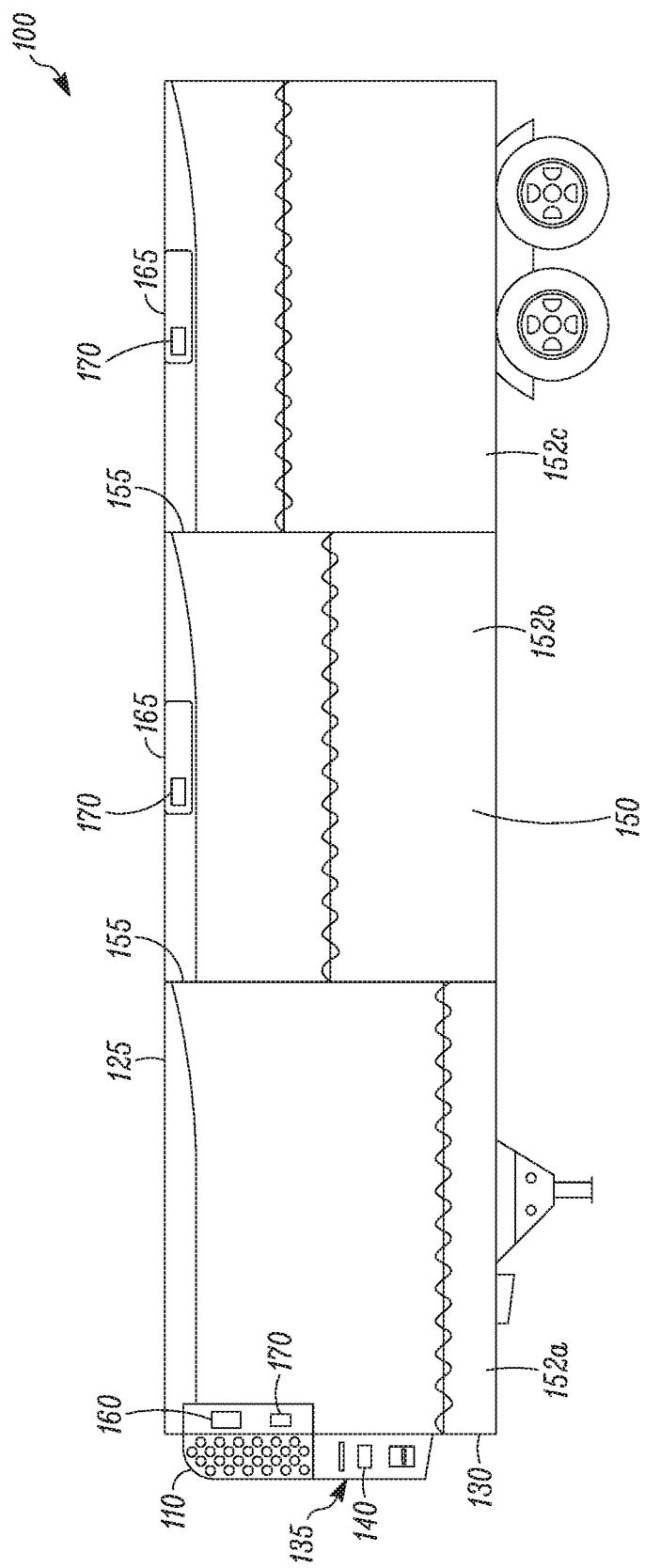
FIG. 1 illustrates a schematic cross sectional side view of a TRS, according to one embodiment.

Embodiments of this disclosure relate generally to a TRS. More specifically, the embodiments relate to a method and system of dynamic power allocation for a TRS.

A TRS can include an electric drive motor configured to drive a compressor in a refrigeration circuit of the TRS. The electric drive motor can be a three-phase alternating current (AC) motor. The electric drive motor can be selected for a particular application based on one or more characteristics, such as, but not limited to, the horsepower output. The expected horsepower output and the actual horsepower output of the electric drive motor can vary, according to some embodiments. For example, the actual horsepower output of the electric drive motor can vary as a result of slight variations in a manufacturing process, a wearing of one or more portions of the electric drive motor over time, etc. Accordingly, the horsepower output of the electric drive motor can vary from motor to motor, and even over time within a given motor.

In some embodiments, the electric drive motor drives the compressor when the TRS is operating in an electric standby mode (e.g., an engine in the TRS is not running). Maximizing the use of the mechanical power can in turn provide a maximum output from the compressor, which can, in some embodiments, maximize the capacity of the TRS.

In order to maximize the use of mechanical power generated by an electric drive motor of a TRS, embodiments described in this disclosure can monitor a current draw from various generator powered components receiving current from a generator (e.g., an alternator and/or a TRU battery charger) and dynamically allocate a maximum allowable power to the compressor based on the monitored current draw so as to maximize a power efficiency of the electric drive motor.

A "refrigerated transport unit" includes, for example, a refrigerated container (e.g., a container on a flat car, an intermodal container, etc.), a truck, a box car, or other similar transport unit.

A "transport refrigeration system" (TRS) includes, for example, a refrigeration system for controlling the refrigeration of an interior space of the refrigerated transport unit. The TRS may be a vapor-compressor type refrigeration system, or any other suitable refrigeration system that can use refrigerant, cold plate technology, or the like.

A "TRS Controller" includes, for example, an electronic device that is configured to manage, command, direct, and regulate the behavior of one or more TRS refrigeration components of a refrigeration circuit (e.g., an evaporator, a condenser, a compressor, an expansion valve (EXV), etc.), a generator, an electronic throttling valve (ETV), etc.

Embodiments of this disclosure may be used in any suitable environmentally controlled transport apparatus, such as, but not limited to, a container (e.g., a container on a flat car, an intermodal container, etc.), a truck, a box car, or other similar refrigerated transport unit. The TRS may be a vapor-compressor type refrigeration system, or any other suitable refrigeration system that can use refrigerant, cold plate technology, or the like.

FIG. 1 illustrates one embodiment of a TRS 100 for a refrigerated transport unit 125. The TRS 100 includes a TRU 110 that controls refrigeration within the refrigerated transport unit 125. The TRU 110 is disposed on a front wall 130 of the refrigerated transport unit 125. The refrigerated transport unit can be a truck or trailer unit that can be attached to a tractor, a ship board container, an air cargo container or cabin, an over the road truck cabin, etc. The TRU 110 includes a programmable TRS Controller 135 that may comprise a single integrated control unit 140 or that may comprise a distributed network of TRS control elements (not shown). The number of distributed control elements in a given network can depend on the particular application of the principles described herein.

The refrigerated transport unit 125 includes an internal space 150 that can be divided into a plurality of zones 152 (a front host zone 152a, a center remote zone 152b, and a rear remote zone 152c). The term "zone" means a portion of an area of the internal space 150. In some examples, each of the zones 152 can have a set point temperature that is the same or different from one another, and may be separated by a wall 155.

As shown in FIG. 1, an evaporator portion 160 of the TRU 110 is configured to provide cooling and/or heating/defrosting to the front host zone 152a. The center remote zone 152b and the rear remote zone 152c each includes a remote evaporator unit 165 that is configured to provide cooling and/or heating/defrosting to the center remote zone 152b and the rear remote zone 152c, respectively. The remote evaporator units 165 are each fluidly connected to the TRU 110 and are part of a refrigeration circuit (not shown) that allows refrigerant to pass through the evaporator portion 160 and the remote evaporator units 165. The TRU 110 and each of the remote evaporator units 165 also include a zone temperature sensor 170 configured to measure temperature in the respective zone 152 in which the zone temperature sensor 170 is provided and send the measured zone temperature to the TRS Controller 135. In some embodiments, the zone temperature sensors 170 can be separate from the remote evaporator units. Also, in some embodiments, the zone temperature sensors 170 can be return air temperature sensors that are configured to measure a return air temperature of the evaporator units 165.

While the zones 152 in FIG. 1 are divided into substantially equal areas, it is to be realized that the internal space 150 may be divided into any number of zones and in any configuration that is suitable for refrigeration of the different zones.

Generally, the TRS Controller 135 is configured to control a refrigeration cycle of the TRS 100. In one example, the TRS Controller 135 controls the refrigeration cycle of the TRS 100 to obtain various operating conditions (e.g., temperature, humidity, air quality etc.) of the internal space 150 as is generally understood in the art. This can include controlling operation of the refrigeration cycle such that each of the zones 152 reach and maintain the desired set point temperature. The TRS Controller 135 is also configured to control a dynamic power allocation system (see the dynamic power allocation systems 200, 255 in FIGS. 2A and 2B) of the TRS 100, as discussed in more detail below.

The TRS Controller 135 generally can include a processor (not shown), a memory (not shown), a clock (not shown) and an input/output (I/O) interface (not shown) and can be configured to receive data as input from various components within the TRS 100, and send command signals as output to various components within the TRS 100. Operation of a TRS Controller, such as the TRS Controller 135, is discussed in more detail below.

Figure 2A:
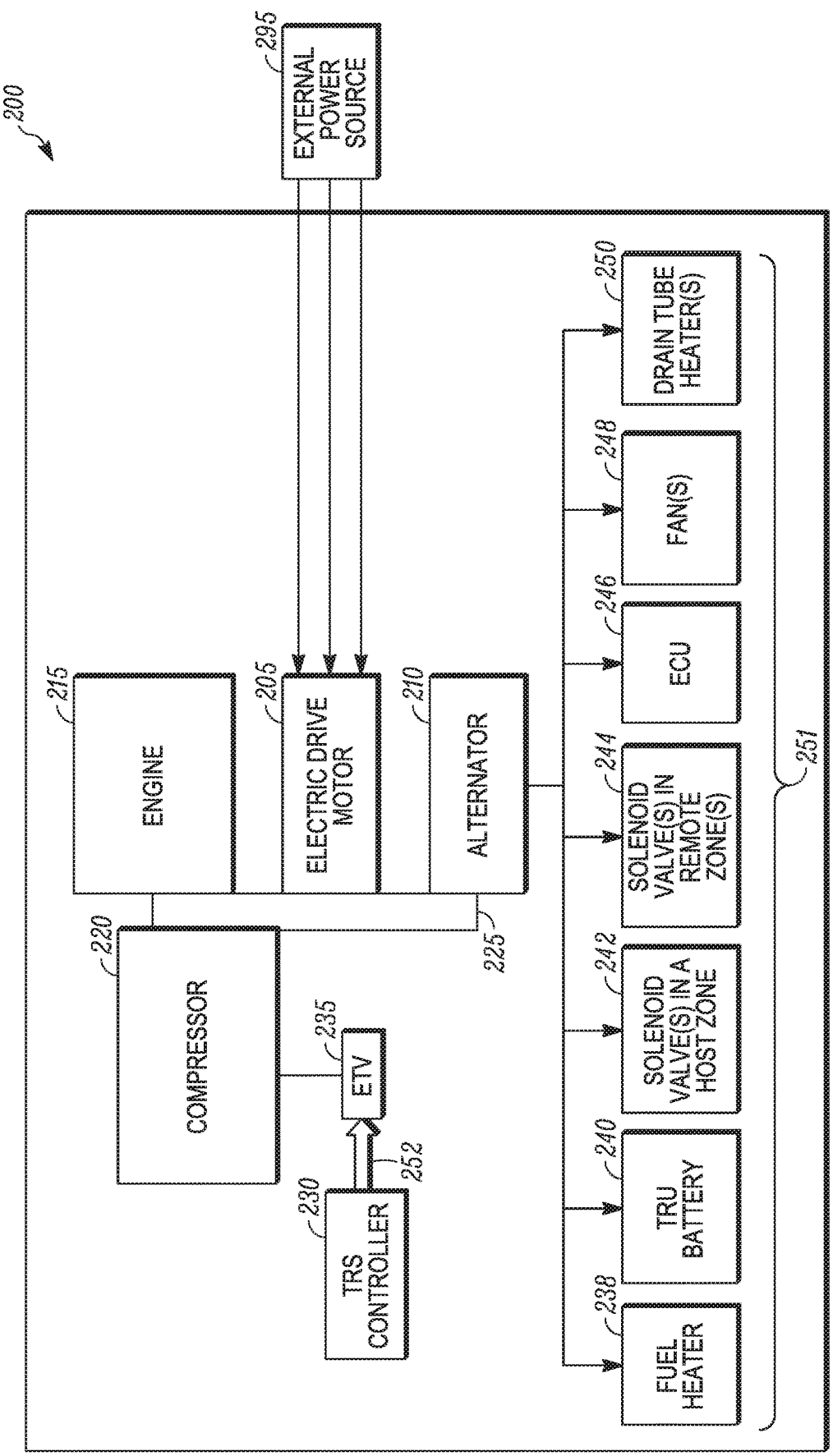
FIG. 2A illustrates a block diagram of a dynamic power allocation system for a TRS, according to one embodiment.
Figure 2B:
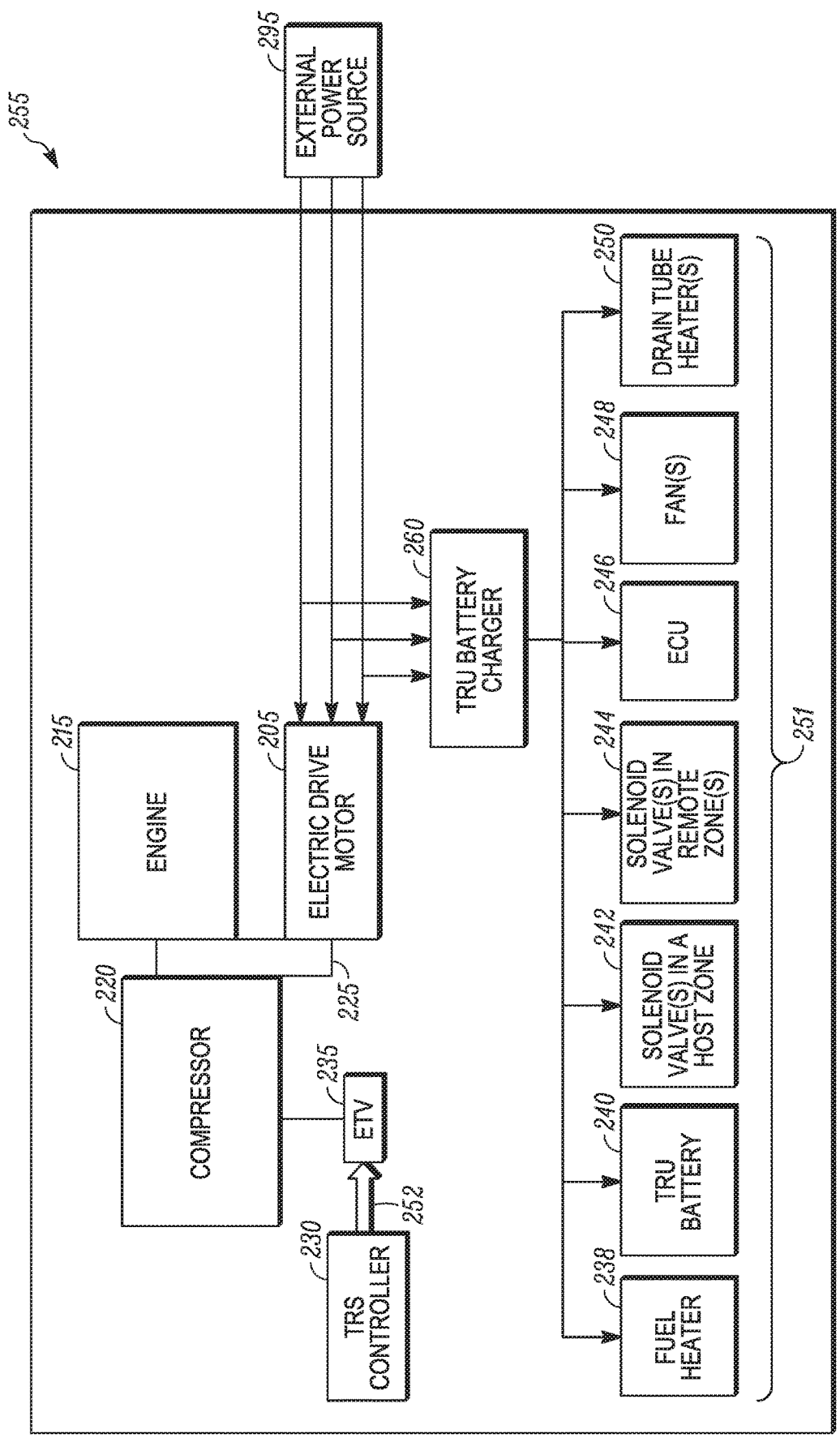
FIG. 2B illustrates a block diagram of a dynamic power allocation system for a TRS, according to another embodiment.

FIGS. 2A and 2B illustrate block diagrams of a dynamic power allocation system 200, 255 for a TRS of a refrigerated transport unit, according to two different embodiments. The dynamic power allocation systems 200, 255 are configured to dynamically allocate maximum available power to a compressor 220 of the TRS when the TRS is connected to and powered by an electric power source (e.g., shore power source) such as the external power source 295. This can occur, for example, when the refrigerated transport unit is operating in an electric standby mode whereby an engine 215 of the TRS is not running but the TRS still requires power to provide refrigeration for the refrigerated transport unit. The electric standby mode can be operated, for example, when the refrigerated transport unit is stored in a distribution yard or at an external storage location. This can also occur when the TRS does not include an engine or when the compressor 220 is not mechanically driven by, for example, a drive system 225, but is an electrically driven compressor.

As shown in FIG. 2A, the dynamic power allocation system 200 includes an electric drive motor 205, an alternator 210, and the engine 215. The electric drive motor 205 is configured to receive power from an external power source 295 and use the power to drive the drive system 225. The electric drive motor 205 can be a three phase alternating current motor, a single phase alternating current motor, or the like. The specifications of the electric drive motor 205 can be dependent on the design of the TRS and user requirements. For example, the electric drive motor 205 can be an about 12 horsepower electric drive motor in some embodiments and an about 19 horsepower electric drive motor in other embodiments. However, it is to be appreciated that the user can choose any horsepower of the electric drive motor 205 based on the refrigeration capacity requirements desired.

The specifications of the electric drive motor 205 can also be dependent on the manufacturer. The electric drive motor 205 can be selected to receive an appropriate voltage from an external power source 295. For example, the electric drive motor 205 can be an about 260 volt or an about 480 volt three phase AC motor. In other embodiments, the voltage supplied to the electric drive motor 205 may vary based on the external power source 295.

In some embodiments, the electric drive motor 205 can be a single speed motor, a two-speed motor configured to operate between a low speed and a high speed, or a variable speed motor. When the electric drive motor 205 is a variable speed motor, an adjustable speed drive (e.g., a variable speed drive (VSD)) (not shown) can be used to control a speed and torque of the electric drive motor 205.

As described herein, the external power source 295 refers to a power source external to a TRS. In some embodiments, the external power source 295 can be a land-based power source that provides grid power from an electric utility company, a shore power source, etc. In other embodiments, the external power source 295 can be a fuel cell, one or more batteries, etc.

The engine 215 is configured to generate mechanical power for the TRS. The engine 215 can be an electrically controlled engine that is controlled by an electronic engine control unit (ECU) (not shown). The ECU can be configured to regulate an amount of fuel delivered to the engine 215 and can be configured to operate the engine 215 at multiple speeds. The ECU is generally configured to allow the engine 215 to be maintained at a chosen speed regardless of the load seen by the engine. As discussed below, the ECU can be controlled by a TRS controller 230 and powered by the alternator 210. In some embodiments, the engine 215 is a ~12 horsepower (HP) engine. In other embodiments, the engine 215 is a ~19 HP engine. As discussed herein, the engine 215 and the electric drive motor 205 can each be referred to a TRS power source.

The drive system 225 transfers mechanical power generated by the engine 215 or the electric drive motor 205 to the alternator 210 and the compressor 220. In some embodiments, the drive system 225 can be, for example, a belt (not shown), a chain (not shown), one or more clutches, etc. to drive the alternator 210 and the compressor 220.

The alternator 210 is configured to convert the mechanical energy derived from the drive system 225 into electrical energy that can be used to power various generator powered components in the TRS. In particular, the alternator 210 provides current to power various current loads 251 including, for example, a fuel heater 238, a TRU battery 240, one or more solenoid valves 242 in a host zone (e.g., the front host zone 152a), one or more solenoid valves 244 in a remote zone (e.g., the center remote zone 152b, the rear remote zone 152c), the ECU 246, one or more fans 248, one or more drain tube heaters 250, one or more accessory loads (e.g., lift gates, hydraulic cylinders, carbonated beverage pumps, etc.) (not shown). In some embodiments, the alternator 210 is a direct current (DC) alternator that is configured to convert the mechanical energy derived from the drive system 225 into DC electrical energy that can be used to power various generator powered components in the TRS. In some embodiments, the alternator 210 is an alternating current (AC) alternator that is configured to convert the mechanical energy derived from the drive system 225 into AC electrical energy that can be used to power various generator powered components in the TRS In some embodiments, the current to the TRU battery 240 can be a shunt current of charge DC current to the TRU battery 240. Also, in some embodiments, the one or more solenoid valves 242, 244, the ECU 246, the one or more fans 248, and the one or more drain tube heaters 250 are configured run on DC current and to run off of a smart field-effect transistor (FET) (not shown). The list of various current loads 251 provided in FIGS. 2A-B are not limiting but can be any power accessory that the TRS may provide power to that is not directly connected to the TRU battery 240. In some embodiments, the list of various current loads 251 can include a power accessory that is powered by the smart FET. A smart FET as discussed herein refers to a transistor that is capable of providing feedback (e.g., to the TRS Controller 230) indicating whether an output (e.g., the various current loads 251) has created an open circuit, a short circuit and a DC current amount drawn by the output.

The compressor 220 represents any type of compressor configured for use in the TRS. For example, the compressor 220 can be a digital scroll, reciprocating, screw, positive displacement, centrifugal, or other suitable type of compressor for compressing a refrigerant in a refrigeration system. The compressor 220 receives refrigerant from an electronic throttling valve (ETV) 235.

The ETV 235 can be configured to control a volume of refrigerant entering the compressor 225. The volume of refrigerant entering the compressor 225 can determine a load on the compressor 220. For example, when a larger volume of refrigerant is being compressed, the load on the compressor 220 is generally greater than when a smaller volume of refrigerant is being compressed. Accordingly, the ETV 230 can be used to control a load on the compressor 220. In some embodiments, opening the ETV 230 increases the volume of refrigerant entering the compressor 225 and closing the ETV 230 decreases the volume of refrigerant entering the compressor 225. The ETV 230 is controlled by the TRS controller 230 via a rugged industrial communication link 252.

The rugged industrial grade communication link 252 can be, for example, a Controller Area Network (CAN) connection (e.g., a J1939 CAN connection), a RS45 connection, or any other rugged industrial grade communication bus that can be relied upon for stable and reliable communication between components in a TRS during transport.

The TRS Controller 230 is similar to the TRS Controller 135 shown in FIG. 1 and is configured to control a refrigeration cycle of the TRS and the dynamic power allocation systems 200, 255.

FIG. 2B illustrates a block diagram of a dynamic power allocation system 255 for a TRS of a refrigerated transport unit when the TRS, according to a second embodiment. The dynamic power allocation system 255 is similar to the dynamic power allocation system 200 except the dynamic power allocation system 255 includes a TRU battery charger 260 and does not include an alternator.

The TRU battery charger 260 is configured to directly receive power from the external power source 295 to charge the TRU battery 240. The TRU battery charger 260 is also configured to provide current to power the other various current loads 251. In some embodiments, the TRU battery charger 260 is configured to provide DC current to power the over various current loads 251. In some embodiments, the TRU battery charger 260 is configured to provide AC current to power the over various current loads 251.

In some embodiments, the dynamic power allocation systems 200, 255 can also be configured to dynamically allocate maximum available power to a compressor 220 of the TRS when the TRS is receiving power from the engine 215. In these embodiments, the dynamic power allocation systems 200, 255 can prevent overloading of the engine 215.

By preventing overloading of the engine 215, the dynamic power allocation systems 200, 255 can thereby prevent the TRS from exceeding, for example, emissions limits.

Operation of the TRS Controller 230 with respect to the dynamic power allocation systems 200, 255 is discussed below with respect to FIG. 3.

Figure 3:
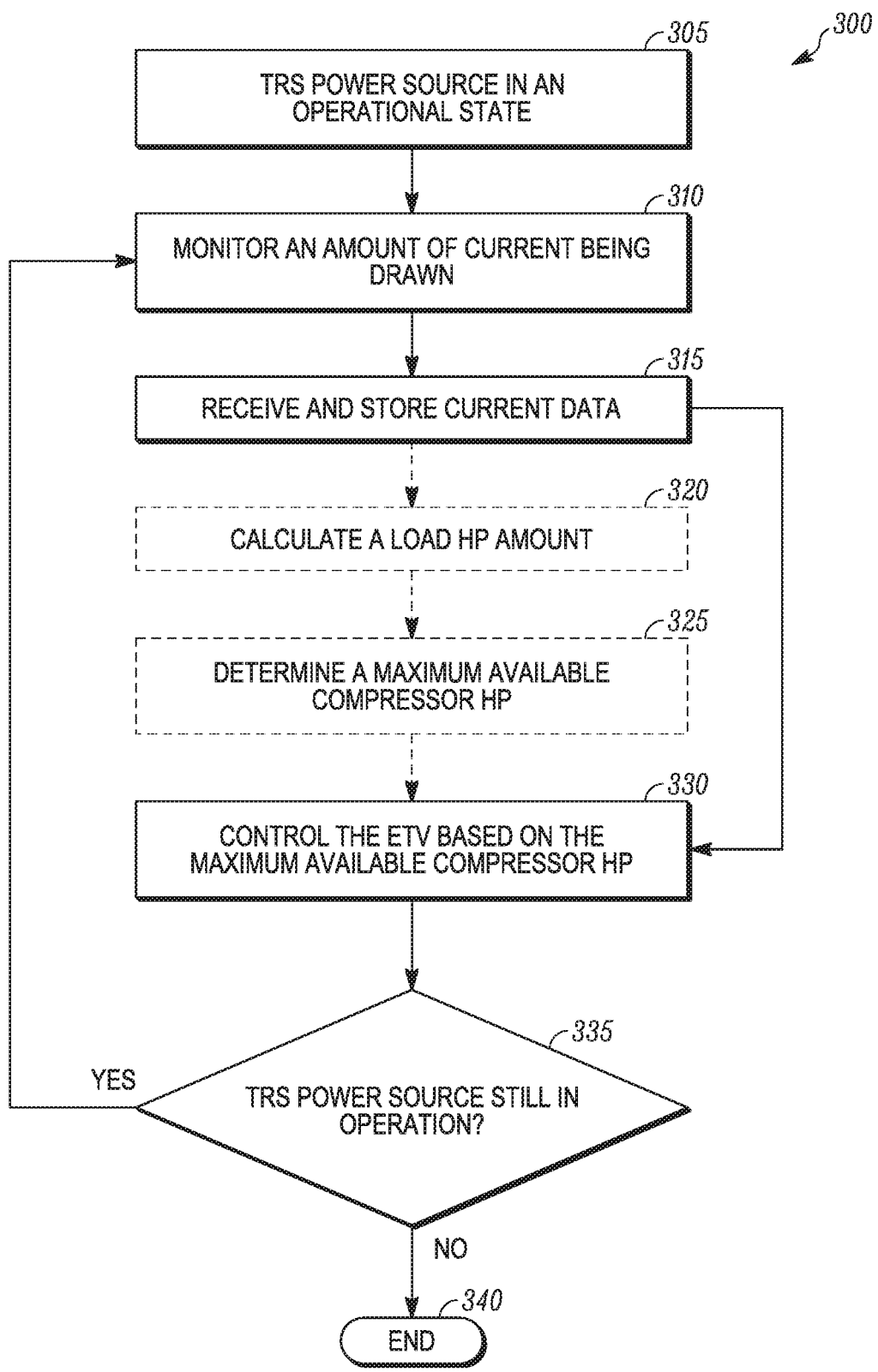
FIG. 3 illustrates a flowchart of a method of dynamic power allocation for a TRS, according to one embodiment.

FIG. 3 illustrates a flowchart of a method 300 of dynamic power allocation using one of the dynamic power allocation systems 200, 255 of a TRS. The method 300 begins at 305, whereby a TRS power source of the TRS is in an operational state.

In some embodiments, this can include the electric drive motor 205 being connected to and powered by an electric power source (e.g., the external power source 295). Accordingly, at 305 the compressor 220 can draw mechanical energy from the drive system 225 via the electric drive motor 205 and the various current loads 251 can draw current from a current source (e.g., the alternator 210 shown in FIG. 2A or the TRU battery charger 260 shown in FIG. 2B). As discussed above, this can occur, for example, when the refrigerated transport unit is operating in an electric standby mode, when the TRS does not include an engine or when the compressor 220 is an electrically driven compressor.

In some embodiments, a TRS power source of the TRS being in an operational state can include the engine 215 being in an operational state to generate power. Accordingly, at 305 the compressor 220 can draw mechanical energy from the drive system 225 via the engine 215 and the various current loads 251 can draw current from a current source (e.g., the alternator 210 shown in FIG. 2A or the TRU battery charger 260 shown in FIG. 2B).

At 310, the dynamic power allocation system 200, 255 monitors an amount of current being drawn by the various current loads 251. In some embodiments, when the various current loads 251 are powered from a smart FET, the smart FET monitors the current being drawn by the various current loads 251 and generates current data indicating the amount of current being used by each of the various current loads 251 to be sent to the TRS Controller 230. In other embodiments, the TRS includes one or more sensors that are configured to monitor the amount of current being used by each of the various current loads 251. Also, in yet some other embodiments, one or more of the various current loads 251 includes a current sensor that monitors the amount of current being used by the respective various current load 251.

In some embodiments, the dynamic power allocation system 200, 255 can monitor an amount of current being drawn by the various current loads 251 in real-time. In other embodiments, the dynamic power allocation system 200, 255 can monitor an amount of current being drawn by the various current loads 251 every, for example, millisecond up to about every minute. The method 300 then proceeds to 315.

At 315, the TRS Controller 230 receives the current data indicating the amount of current being used by each of the various current loads 251 and stores the current data into a storage portion of the TRS Controller 230. The method 300 then proceeds to 330. Optionally, in some embodiments, when the dynamic power allocation system 200 is used, the method 300 can optionally proceed to 320.

At optional 320, the TRS Controller 230 uses the current data to calculate a load HP amount. The load HP amount is calculated based on the current data and, for example, a power efficiency of the alternator 210 to deliver current to the various current loads 251, and a power efficiency of the drive system 225 to deliver mechanical power to the compressor 220 and the alternator 210.

In some embodiments, the power efficiency of the alternator 210 can be a fixed variable value stored in the memory portion of the TRS Controller 230, where the fixed variable value is set by a user based off of simulation testing or the like. For example, in one embodiment using the dynamic power allocation system 200, the power efficiency of the alternator 210 can be set to a value between about ~40% and ~50%. The method 300 can then optionally proceed to 325.

At 325, the TRS Controller 230 determines a maximum available compressor HP. In some embodiments, the maximum available compressor HP is determined by subtracting the load HP amount from a HP of the electric drive motor 205. Also, in some embodiments, the maximum available compressor HP is determined by subtracting the load HP amount from a HP of the engine 215. The method 300 then proceeds to 330.

At 330, the TRS Controller 230 controls the ETV 235 based on the maximum available compressor HP so as to dynamically allocate a maximum available horsepower to the compressor 220. In particular, the TRS Controller opens or closes an opening of the ETV that allows refrigerant to pass there through to the compressor based on the maximum available compressor HP. Accordingly, a maximum allowable horsepower can be allocated to the compressor 220 while preventing the electric drive motor 205 and/or the engine 215 from overloading. Overloading the electric drive motor 205 can reduce the overall life expectancy of the electric drive motor 205 and prevent damage to portions of the electric drive motor 205 (e.g., a motor winding insulation of the electric drive motor 205). Overloading the engine 215 can cause the engine 215 to exceed, for example, emissions limits.

In some embodiments, when the dynamic power allocation system 255 is used, the maximum available horsepower can be the maximum available horsepower generated by the electric drive motor 205 because the TRU battery charger 260 is connected directly to the external power source 295 as opposed to receiving horsepower from the drive system 225. In some embodiments, the maximum available horsepower generated by the electric drive motor 205 can be based on physical constraints of the electric drive motor 205 or user defined constraints of the electric drive motor 205.

Also, in some embodiments, when the electric drive motor 205 is a variable speed drive motor that is driven by an adjustable speed drive, the dynamic power allocation system can adjust the speed of the electric drive motor 205 based on one or more of the maximum available horsepower and the amount of horsepower required by the compressor 220. The method 300 then proceeds to 335.

At 335, the TRS Controller 230 determines whether the TRS power source is still operation. For example, when the power source of the TRS is the electric drive motor 205, the electric drive motor 205 is still being powered by the external power source 295. If the electric drive motor 205 is still being powered by the external power source 295, the method 300 proceeds back to 310. Accordingly, the method 300 can continuously allocate a maximum available horsepower to the compressor 220 while the electric drive motor 205 is being powered by the external power source 295. If the electric drive motor 205 is no longer being powered by the external power source 295, the method 300 proceeds to 340 and the method 300 ends.

For example, when the TRS power source is the engine 215, the engine 215 is still being in an operational state for generating power. If the engine 215 is still generating power, the method 300 proceeds back to 310. Accordingly, the method 300 can continuously allocate a maximum available horsepower to the compressor 220 while the engine 215 is generating power. If the engine 215 is no longer in an operation state to generate power, the method 300 proceeds to 340 and the method 300 ends.

ASPECTS

It is noted that any of aspects 1-21 can be combined.

Aspect 1. A method for dynamic power allocation in a transport refrigeration system (TRS), the method comprising:
 a TRS power source operating in an operational state;
 monitoring an amount of current being drawn from one or more generator powered components of the TRS;
 calculating, via a TRS controller of the TRS, a maximum available horsepower amount based on the amount of current being drawn from the one or more generator powered components; and
 controlling, via the TRS controller, an amount of horsepower directed to a compressor of the TRS based on the maximum available horsepower amount.

Aspect 2. The method according to aspect 1, further comprising the TRS controller receiving and storing the amount of current being drawn from the one or more generator powered components.

Aspect 3. The method according to any of aspects 1-2, further comprising calculating a load horsepower amount based on an amount of current being drawn from the one or more generator powered components; and
 calculating the maximum available horsepower amount based on the load horsepower amount.

Aspect 4. The method according to aspect 3, wherein calculating the maximum available horsepower amount includes:
 subtracting the load horsepower amount from a horsepower of the TRS power source.

Aspect 5. The method according to any of aspects 1-4, further comprising calculating the maximum available horsepower amount based on a power efficiency of a current source of the TRS providing current to the one or more generator powered components.

Aspect 6. The method according to any of aspects 1-5, further comprising calculating the maximum available horsepower amount based on a power efficiency of a drive system of the TRS to deliver mechanical power in the TRS.

Aspect 7. The method according to any of aspects 1-6, wherein controlling the amount of horsepower directed to the compressor includes:
 controlling an opening of an electronic throttling valve of the TRS based on the maximum available horsepower amount.

Aspect 8. The method according to any of aspects 1-7, wherein the TRS power source is an electric drive motor, and
 the TRS power source operating in an operational state includes an electric power source powering the electric drive motor.

Aspect 9. The method according to any of aspects 1-7, wherein the TRS power source is an engine, and
 the TRS power source operating in an operational state includes the engine generating power.

Aspect 10. A transport refrigeration system (TRS), comprising:
 a refrigeration circuit including a compressor;
 a TRS power source configured to drive the compressor;
 one or more generator powered components;
 a current source configured to provide current to the one or more generator powered components; and
 a TRS controller programmed to monitor in an amount of current being drawn from the one or more generator powered components, calculate a maximum available horsepower amount based on the amount of current being drawn from the one or more generator powered components, and control an amount of horsepower allocated to the compressor based on the maximum available horsepower amount.

Aspect 11. The TRS according to aspect 10, further comprising an electronic throttling valve (ETV) configured to control an amount of refrigerant directed to the compressor,
 wherein the TRS controller is programmed to control an opening of the ETV in order to control the amount of horsepower allocated to the compressor.

Aspect 12. The TRS according to any of aspects 10-11, wherein the current source is at least one of an alternator and a transport refrigeration unit (TRU) battery charger.

Aspect 13. The TRS according to any of aspects 10-12, wherein the one or more generator powered components includes at least one of a fuel heater, a TRU battery, a solenoid valve in a host zone, a solenoid valve in a remote zone, an engine control unit, a fan and a drain tube heater.

Aspect 14. The TRS according to any of aspects 10-13, wherein the current source is a direct current (DC) current source.

Aspect 15. The TRS according to any of aspects 10-14, wherein the TRS controller is programmed to receive and store the amount of current being drawn from the one or more generator powered components.

Aspect 16. The TRS according to any of aspects 10-15, wherein the TRS controller is programmed to calculate a load horsepower amount based on an amount of current being drawn from the one or more generator powered components, and calculate the maximum available horsepower amount based on the load horsepower amount.

Aspect 17. The TRS according to aspect 16, wherein the TRS controller is programmed to subtract the load horsepower amount from a horsepower of the TRS power source to calculate the maximum available horsepower amount.

Aspect 18. The TRS according to any of aspects 10-17, wherein the TRS controller is programmed to calculate the maximum available horsepower amount based on a power efficiency of the current source of the TRS providing current to the one or more generator powered components.

Aspect 19. The TRS according to any of aspects 10-18, wherein the TRS controller is programmed to calculate the maximum available horsepower amount based on a power efficiency of a drive system of the TRS to deliver mechanical power in the TRS.

Aspect 20. The TRS according to any of aspects 10-19, wherein the TRS power source is an electric drive motor powered by an electric power source.

Aspect 21. The TRS according to any of aspects 10-19, wherein the TRS power source is an engine.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

What is claimed is:

1. A method for dynamic power allocation in a transport refrigeration system (TRS), the method comprising:
   monitoring an amount of current being drawn by one or more loads of the TRS, wherein the one or more loads include one or more of a fuel heater, a transport refrigeration unit battery, a solenoid valve, a drain tube heater, or an accessory load;
   determining a load power draw based on the amount of current being drawn by the one or more loads of the TRS;
   determining a maximum available power amount based on the amount of current being drawn by the one or more loads; and
   dynamically controlling, via a controller, an amount of power directed to the compressor of the TRS to continuously allocate the maximum available power amount to the compressor of the TRS.

2. The method of claim 1, further comprising operating a TRS power source in an operational state by providing power to an electric drive motor from an electric power source.

3. The method of claim 2, wherein the electric power source includes one or more batteries.

4. The method of claim 2, wherein the one or more loads are connected to a current source connected to the electric power source.

5. The method according to claim 4, further comprising calculating the maximum available power amount based on a variable corresponding to a power efficiency of the current source.

6. The method of claim 1, wherein determining the maximum available power amount includes subtracting the load power draw from a maximum power of a TRS power source.

7. The method of claim 1, wherein continuously allocating the maximum available power to the compressor of the TRS includes controlling an opening of an electronic throttling valve of the TRS based on the maximum available power amount.

8. A transport refrigeration system (TRS), comprising:
   a refrigeration circuit including a compressor;
   a TRS power source configured to drive the compressor;
   one or more loads, wherein the one or more loads include one or more of a fuel heater, a transport refrigeration unit battery, a solenoid valve, a drain tube heater, or an accessory load;
   a current source configured to provide current to the one or more loads; and
   a controller programmed to monitor an amount of current being drawn by the one or more loads, determine a load power draw based on an amount of current being drawn by the one or more loads, determine a maximum available power amount based on the load power draw, and dynamically control an amount of power allocated to the compressor to continuously allocate the maximum available power amount to the compressor.

9. The TRS of claim 8, further comprising an electronic throttling valve (ETV) configured to control an amount of refrigerant directed to the compressor,
   wherein the controller is programmed to control an opening of the ETV in order to control the amount of power allocated to the compressor.

10. The TRS of claim 8, wherein the TRS power source is an electric drive motor connected to an electric power source, and wherein the current source is connected to the electric power source.

11. The TRS of claim 9, wherein the electric power source includes one or more batteries.

12. The TRS of claim 8, wherein the current source is a direct current (DC) current source.

13. The TRS of claim 8, wherein the controller is programmed to receive and store the amount of current being drawn by the one or more loads.

14. The TRS of claim 8, wherein the controller is programmed to subtract the load power draw from a power of the TRS power source to calculate the maximum available power amount.

15. The TRS of claim 8, wherein the controller is programmed to calculate the maximum available power amount based on a variable corresponding to a power efficiency of the current source of the TRS providing current to the one or more loads.

* * * * *